United States Patent [19]

Bien et al.

[11] 4,299,966
[45] Nov. 10, 1981

[54] PROCESS FOR THE PREPARATION OF 4,4′,7,7′-TETRACHLORTHIOINDIGO IN PIGMENT FORM

[75] Inventors: Hans-Samuel Bien, Burscheid; Werner Beinert; Klaus Wunderlich, both of Leverkusen, all of Fed. Rep. of Germany

[73] Assignee: Bayer Aktiengesellschaft, Leverkusen, Fed. Rep. of Germany

[21] Appl. No.: 163,851

[22] Filed: Jun. 27, 1980

Related U.S. Application Data

[63] Continuation of Ser. No. 37,395, May 8, 1979, abandoned, which is a continuation of Ser. No. 637,203, Dec. 3, 1975, abandoned.

[30] Foreign Application Priority Data

Dec. 6, 1974 [DE] Fed. Rep. of Germany ....... 2457703

[51] Int. Cl.$^3$ .................................................. C09B 7/00
[52] U.S. Cl. ....................................................... 549/52
[58] Field of Search ......................................... 549/52

[56] References Cited

U.S. PATENT DOCUMENTS

| | | | |
|---|---|---|---|
| 1,710,981 | 4/1929 | Hoffa | 549/52 |
| 1,938,054 | 12/1933 | Steiger | 549/52 |
| 2,029,714 | 2/1936 | Hagenböcker | 549/52 |

*Primary Examiner*—Alan Siegel
*Attorney, Agent, or Firm*—Sprung, Felfe, Horn, Lynch & Kramer

[57] ABSTRACT

4,4′,7,7′-Tetrachlorothioindigo can be obtained in a form directly suitable for use as a pigment if the oxidation of 3-hydroxy-4,7-dichloro-1-thionaphthene is performed in an alkaline medium in the presence of oxygen or an oxygen-containing gas.

4 Claims, No Drawings

PROCESS FOR THE PREPARATION OF 4,4',7,7'-TETRACHLORTHIOINDIGO IN PIGMENT FORM

This is a continuation of application Ser. No. 037,395, filed May 8, 1979 (now abandoned) which, in turn, is a continuation of application Ser. No. 637,203, filed Dec. 3, 1975 (now abandoned).

The invention relates to a process for the preparation of 4,4',7,7'-tetrachlorothioindigo in a form which is directly suitable for dyeing lacquers and plastics.

4,4',7,7'-Tetrachlorothioindigo has hitherto been prepared by reaction of 2,5-dichlorophenylthioglycollic acid with chlorosulphonic acid at about 35° C. (German patent specification No. 241,910). The product thereby obtained is in a form unsuitable for use as a pigment and must first be subjected to a comminution process, for example a wet grinding process in accordance with the instructions of German Offenlegungsschrift (German Published Specification) No. 2,043,820.

A further process (Russian patent specification No. 327,218) allows 2,5-dichlorophenylthioglycollic acid to react with chlorosulphonic acid only as far as the stage of 3-hydroxy-4,7-dichloro-1-thionaphthene. This intermediate product is isolated and oxidised with sodium polysulphide to tetrachlorothioindigo. Though in this case an acceptable pigment formed is achieved, the process has not found industrial acceptance because of its effluent problems and off-gas problems.

In a further process (German patent specification No. 197,162), arylthioglycollic acids are first converted to the acid chlorides, then cyclised with aluminium chloride and finally oxidised with complex iron-(III) salts.

The involved method of manufacture makes industrial utilisation of the process uneconomical.

The direct chlorination of thioindigo (Swiss patent specification No. 441,253) does not give the desired signal product.

It has now been found, surprisingly, that a colorant which is directly suitable for use as a pigment is obtained in a simple manner if 3-hydroxy-4,7-dichloro-1-thionaphthene is oxidised to 4,4',7,7'-tetrachlorothioindigo with oxygen or an oxygen-containing gas, for example air, in an alkaline aqueous or aqueous-organic phase.

The 3-hydroxy-4,7-dichloro-1-thionaphthene required can be prepared either from 2,5-dichlorophenylthioglycollic acid by reaction with chlorosulphonic acid or via 2,5-dichlorophenylthioglycollic acid chloride, and reaction with aluminium chloride.

The oxidation is carried out with oxygen or an oxygen-containing gas, for example air, in an aqueous or aqueous-organic phase, such as water-pyridine, water-ethoxyethanol, water-ethanol, or water-diethylene glycol monoethyl ether, at temperatures of 10° C. to the boiling point of the mixture, preferably at 50° to 100° C. The alkalinity of the medium is brought about by adding bases, such as sodium hydroxide, potassium hydroxide, sodium carbonate, ammonia or barium hydroxide. Catalysts which can be used to accelerate the oxidation reaction are metal salts, metal oxides and metal hydroxides in which the metal is a transition element, for example copper, cobalt or manganese.

Preferably, the reaction is carried out at a pH between 9 and 14.

After completion of the oxidation, the course of which can be followed in terms of the decrease in the amount of the intermediate product 3-hydroxy-4,7-dichloro-1-thionaphthene, for example chromatographically or by measuring the redox potential, the reaction product is isolated in the usual manner by filtering off, and washing the filter residue with water, preferably after prior neutralisation or acidification of the mixture with dilute inorganic acids, such as hydrochloric acid or sulphuric acid, or organic acids, such as acetic acid. To achieve optimum pigment properties, the reaction mixture can be stirred during the oxidation or subsequently, with addition of an emulsifier or a dispersing agent. The dried and powdered product is a pigment of high tinctorial strength which, without further conditioning, is distinguished by brilliant gloss, good hiding power and good fastness to light when used to colour stoving lacquers, and gives a lacquer of low viscosity which has very good flow.

EXAMPLE 1

40 g of 2,5-dichlorophenylthioglycollic acid are introduced into 200 ml of chlorosulphonic acid at 0°–5° C. and the mixture is kept for 5 hours at 0°–5° C. It is then stirred into 1 kg of ice, the product is filtered off, and after washing until neutral the filter residue, the solids content of which consists, to the extent of about 40%, of 4,4',7,7'-tetrachlorothioindigo which has already been formed, is stirred into 150 ml of water.

After adding 1 g of $CuSO_4.5H_2O$ and 27 g of 50% strength sodium hydroxide solution air at a rate of 15–20 l/hr is passed into the reaction mixture at 80° C. until 3-hydroxy-4,7-dichloro-1-thionaphthene is no longer detectable chromatographically. The product is filtered off hot and washed with hot water until a sample of the filtrate which issues shows a pH value of 9–10; the filter residue is then pressed out well and introduced into a mixture of 60 ml of concentrated hydrochloric acid, 600 ml of water and 0.5 g of a commercially available anionic dispersing agent, and the suspension is kept for 1 hour at 70° C. The product is filtered off hot, washed until neutral and dried at 60°–70° C., and 28 g of a red-violet powder (76% of theory) are obtained.

EXAMPLE 2

40 g of 2,5-dichlorophenylthioglycollic acid are first reacted in chlorosulphonic acid as described in Example 1, and the reaction product obtained after pouring the mixture onto ice is oxidised under alkaline conditions with air at 80° C., in the manner indicated, until 3-hydroxy-4,7-dichloro-1-thionaphthene is no longer detectable. The mixture is cooled to 70° C. and the suspension is brought to a pH value of 2–3 by adding hydrochloric acid and is stirred for 1 hour at 70° C. The product is filtered off hot and washed until neutral, and after drying at 60° C., 30 g of a violet product (81% of theory) are obtained.

EXAMPLE 3

40 g of 2,5-dichlorophenylthioglycollic acid are reacted in chlorosulphonic acid as indicated in Example 1, and the product obtained after pouring out the melt onto ice is oxidised with air under alkaline conditions at 70° C. until the 3-hydroxy-4,7-dichloro-1-thionaphthene has disappeared.

40 ml of acetic acid and 0.5 g of a commercially available anionic emulsifier are added, the mixture is kept at 70° C. for 1 hour whilst stirring and the product is filtered off hot and washed until neutral; after drying at 60° C., 30.5 g of dyestuff (83% of theory) are isolated.

EXAMPLE 4

40 g of 2,5-dichlorophenylthioglycollic acid are introduced into 150 ml of chlorosulfonic acid at 0°–5° C. and the mixture is kept at 0°–5° C. hours. It is then stirred into 1,000 g of ice and filtered, and the press cake is washed until neutral and then introduced into 150 ml of water. After adding 1 g of $CuSO_4.5H_2O$ and 20 ml of concentrated ammonia solution air is passed into the reaction mixture at 80° C. until 3-hydroxy-4,7-dichloro-1-thionaphthene is no longer detectable chromatographically. The reaction batch is worked up as indicated in Example 1 and 29.1 g of red-violet organic pigment (79% of theory) are obtained.

EXAMPLE 5

40 g of 2,5-dichlorophenylthioglycollic acid are introduced into 200 ml of chlorosulphonic acid at 13°–15° C. and the mixture is kept at 13°–15° C. for 6 hours. The melt is then stirred into 1,000 g of ice and the product is filtered off and washed until neutral. After drying at 60° C., 30.8 g of red-violet dyestuff (83% of theory) are obtained.

The product is a pigment of low tinctorial strength, which, when used to colour stoving lacquers, gives a lacquer of very poor flow.

EXAMPLE 6

40 g of 2,5-dichlorophenylthioglycollic acid are introduced into 200 ml of chlorosulphonic acid at 0°–5° C. and the mixture is kept at 0°–5° C. for 10 hours. It is then stirred into 1 kg of ice, the product is filtered off and the filter residue, which has been washed until neutral and of which the solids content consists, to the extent of about 60%, of 4,4',7,7'-tetrachlorothioindigo, which has already formed, is stirred into 150 ml of water. 1 g of $CuSO_4.5H_2O$ and 27 g of 50% strength sodium hydroxide solution are added and air (20-22 l/hr) is passed into the reaction mixture at 60° C. until no 3-hydroxy-4,7-dichloro-1-thionaphthene is detectable chromatographically. The mixture is worked up as described in Example 3 and 29 g of red-violet pigment (79% of theory) are obtained.

EXAMPLE 7

Following the description in Example 1, 40 g of 2,5-dichloro-phenylthioglycollic acid are first reacted in chlorosulphonic acid, the melt is poured onto ice to form a paste, and the reaction product is stirred into water. After adding 1 g of $CoSO_4.7H_2O$ and 27 g of 50% strength sodium hydroxide solution the mixture is treated with air at 80° C. until 3-hydroxy-4,7-dichloro-1-thionaphthene is no longer detectable chromatographically. The reaction batch is worked up as indicated in Example 1 and 28 g of violet product (76% of theory) are isolated.

EXAMPLE 8

32 g of 3-hydroxy-4,7-dichloro-1-thionaphthene are stirred into 150 ml of water, 27 g of 50% strength sodium hydroxide solution and 1 g of $CuSO_4.5H_2O$ are added and air (20 to 25 l/hr) is passed into the reaction mixture at 80° C. until starting product is no longer detectable chromatographically. The mixture is cooled to 70° C., 39 ml of glacial acetic acid and 0.5 g of a commercially available anionic emulsifier are added and the mixture is kept at 70° C. for 1 hour. It is then filtered hot and the residue is washed until neutral and dried at 60° C. Yield: 25 g of red-violet colorant (78% of theory).

EXAMPLE 9

108 g of 50% strength sodium hydroxide solution are added to a suspension of 128 g of 3-hydroxy-4,7-dichloro-1-thionaphthene in 700 ml of water and oxygen is passed through the reaction mixture, at 80° C., using a gassing stirrer (speed about 2,000 revolutions per minute), until the starting material has disappeared, according to chromatographic tests. The suspension is cooled to 70° C. and adjusted to a pH value of 3-4 by adding hydrochloric acid, 0.5 g of a commercially available emulsifier is added and the whole is stirred for 1 hour at 70° C. The product is filtered off hot and washed until neutral, and after drying at 60° C. 97 g of dyestuff (76% of theory) are isolated.

We claim:

1. Process for the preparation of 4,4',7,7'-tetrachlorothioindigo in a form directly suitable for use as a pigment comprising oxidizing 3-hydroxy-4,7-dichloro-1-thionaphthalene with oxygen or an oxygen-containing gas in an alkaline aqueous or aqueous-organic medium in the presence of a catalyst selected from the group consisting of metal salts, metal oxides and metal hydroxide in which the metal is a transition metal at temperatures from 10° C. to the boiling point of said medium.

2. Process according to claim 1, characterised in that the oxidation is carried out in an aqueous or aqueous-organic phase.

3. A process according to claim 1, wherein the process is carried out in the presence of a copper compound.

4. A process according to claim 3, wherein the copper compound is $CuSO_4$.

* * * * *